UNITED STATES PATENT OFFICE.

JOHN A. WESENER, OF CHICAGO, ILLINOIS.

GERM-PROOF FILTER AND METHOD OF MAKING SAME.

SPECIFICATION forming part of Letters Patent No. 599,030, dated February 15, 1898.

Application filed March 15, 1897. Serial No. 627,686. (No model.)

*To all whom it may concern:*

Be it known that I, JOHN A. WESENER, residing at Chicago, in the county of Cook and State of Illinois, have invented a new and useful Germ-Proof Filter and Method of Making the Same, of which the following is a specification.

My invention has relation to filters; and its object is to produce in a simple and inexpensive manner a filtering medium which shall be shown by various bacteriologic methods to absolutely prevent the passage of bacteria through it—that is, a germ-proof filter. To this end, in general terms, I employ any suitable porous material, preferably a fibrous material—such as cotton fiber, wood fiber, or various kinds of paper, and the like—the object of such porous material being simply to form a framework or base for the precipitated chemical, as hereinafter described. This porous material is soaked for a proper period of time in any substance which is soluble and can be precipitated by any reagent capable of causing a precipitation in the form of crystalline or amorphous material or powder. This powder or precipitate is deposited uniformly in the cells or openings of the filter-framework and thus provide a very fine and even porosity to the filter—so fine as to prevent the passage of bacteria.

In actual practice I prefer to employ a fibrous material, such as cotton-fiber paper similar to blotting-paper, which I have found satisfactory for the purpose as well as desirable owing to its cheapness and abundance. For the solution I prefer a solution of liquid glass—sodium silicate ($Na_4SiO_4$)—although, as before stated, any other substance giving the same result may be used as an equivalent. The paper is soaked in the solution until all the meshes, cells, and entire body are thoroughly impregnated with the solution. The paper thus treated may now be run through a roller to remove any excess of the solution; but this step of the process is not necessary and may be dispensed with, although in some cases it might prove beneficial. The paper is then immersed in or treated to ten to twenty per cent. hydrochloric acid or ammonium chlorid or any other reagent capable of causing precipitation. The liquid glass is thereby precipitated in all the meshes, cells, and passages in the fibrous material in the form of a very fine crystalline powder and in a uniform manner, whereby the porosity of the resulting filter will be correspondingly uniform and even. The filter after being dried is ready for use.

Other chemical substances in solution may be substituted for the liquid glass, provided they are capable of precipitation, and likewise other reagents, as the acids, alkalies, and the like, may be employed for causing precipitation without departing from the spirit of my invention and scope of my claims.

My filter is particularly applicable to the filtration of water, and under various conditions of time and water-pressure it will be found that the bacteria are prevented from passing through.

My filter as the filtering medium for the filtration of water or other liquids has the advantage that by chemical means its density can be determined and uniformly assured and the porosity of filters evenly distributed and thus maintained. Furthermore, the cost is such that the medium may be thrown away and new ones substituted without material loss and without the necessity of cleaning, as required in the filtering media now in use.

My filter may be made of any thickness and shape, as desired.

I claim—

1. The method of making germ-proof filters which consists in impregnating a porous material with a substance in solution and then causing such a precipitation of such substance in the porous material as to leave the latter penetrable or non-resistant to the passage of water.

2. The method of making germ-proof filters which consists in precipitating a chemical substance in the body of a material used as a base or framework, the precipitation being such as to leave the material penetrable or non-resistant to the passage of water.

3. The method of making germ-proof filters which consists in impregnating fibrous material with a solution of liquid glass and then precipitating the liquid glass in the pores and cells of the fibrous material by means of a chemical reagent, the precipitation being such as to leave the material penetrable or non-resistant to the passage of water.

4. The method of making germ-proof filters which consists in precipitating liquid glass in the pores and cells of a fibrous material, the precipitation being such as to leave the material penetrable or non-resistant to the passage of water.

5. The method of making germ-proof filters which consists in impregnating fibrous material with a substance in solution capable of precipitation and then causing a precipitation of such substance into the fibrous material by means of a chemical reagent, the precipitation being such as to leave the material penetrable or non-resistant to the passage of water.

6. A germ-proof filter comprising a porous material as a framework or base and a chemical substance in precipitation in the pores of the material, the precipitation being such as to leave the material penetrable or non-resistant to the passage of water.

7. A germ-proof filter comprising a cotton-fiber paper and a chemical substance in precipitation therein, the precipitation being such as to leave the paper penetrable or non-resistant to the passage of water.

8. A germ-proof filter comprising a fibrous material and liquid glass in precipitation therein, the precipitation being such as to leave the material penetrable or non-resistant to the passage of water.

9. A germ-proof filter comprising a cotton-fiber paper and liquid glass in precipitated form in the pores and cells of the paper, the precipitation being such as to leave the paper penetrable or non-resistant to the passage of water.

JOHN A. WESENER.

Witnesses:
WM. M. HARSHA,
W. H. BALLENGER.